United States Patent [19]

Seri et al.

[11] 3,777,239

[45] Dec. 4, 1973

[54] VOLTAGE REGULATOR FOR DC POWER SOURCE

[75] Inventors: Tsutomu Seri, Kadoma; Shinogu Abe, Nara, both of Japan

[73] Assignee: Matsushita Electric Industrial Co., Ltd., Oaza Kadoma, Kadoma-shi, Osaka-fu, Japan

[22] Filed: Aug. 16, 1972

[21] Appl. No.: 281,121

[30] Foreign Application Priority Data

Aug. 19, 1971 Japan............................ 46/63512

[52] U.S. Cl.................. 318/345, 321/25, 323/17, 323/35
[51] Int. Cl. ................................................ H02p 9/00
[58] Field of Search.................. 323/17, 40, 34–37; 321/9, 21, 25, 47; 318/345

[56] References Cited

UNITED STATES PATENTS

| | | | |
|---|---|---|---|
| 3,284,691 | 11/1966 | Schulz et al. ............... | 321/25 X |
| 3,663,943 | 5/1972 | Nakajima et al............. | 321/47 X |
| 3,594,629 | 7/1971 | Kawakami et al........... | 318/345 X |

*Primary Examiner*—Gerald Goldberg
*Attorney*—Milton J. Wayne et al.

[57] ABSTRACT

In a DC power source in which a silicon controlled rectifier is connected in series with a DC circuit of a single phase AC bridge rectifier so that the phase of the firing angle may be controlled to control the load voltage upon the armature of a D.C. motor, a saturable reactor is inserted in series with the AC power source of said bridge rectifier.

4 Claims, 8 Drawing Figures

VOLTAGE REGULATOR FOR DC POWER SOURCE

BACKGROUND OF THE INVENTION

The present invention relates to a voltage regulator for a DC power source and more particularly for a DC power source of the type using a single phase AC bridge rectifier.

In the prior art DC power source of the type in which silicon controlled rectifiers are connected in a DC circuit of a single phase AC bridge rectifier so as to control the firing or triggering angle, thereby controlling the load voltage, two SCRs are generally used in order to ensure the positive turn-off of the SCRs. If only one SCR is used, the failure to turn it off tends to occur, depending upon the frequency and voltage of the AC power source.

SUMMARY OF THE INVENTION:

The present invention was made to overcome the defects encountered in the prior art DC power source of the type described. Briefly stated, according to the present invention, a saturable reactor is inserted in series in an AC power source circuit of a single phase bridge rectifier.

DESCRIPTION OF THE PREFERRED EMBODIMENT

PRIOR ART, FIG. 1

Prior to the description of the one preferred embodiment of the present invention, the prior art single-phase bridge phase control circuit will be briefly described in order to distinctly point out the problems encountered in the prior art circuit. The prior art single phase bridge phase control circuit for DC motors generally uses two SCRs. The phase control circuit of the single phase bridge type in the prior art using only one SCR tends to mis-fire, thus bringing about a problem of reliability. The present invention, therefore, has as its object to provide a phase control circuit of the type using only one SCR which is simple in construction and reliable in operation thereby, eliminating the problem of misfiring, referred to above.

Figure 1:
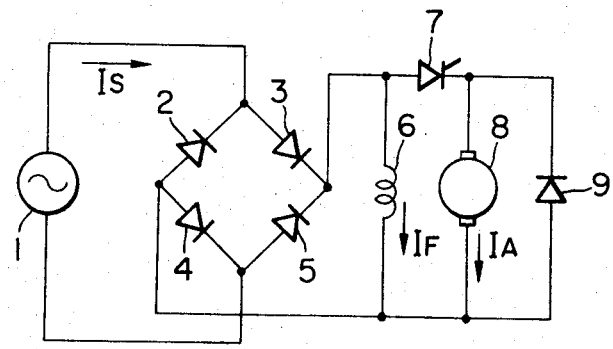
FIG. 1 is a circuit diagram of the prior art single phase bridge phase control circuit using one SCR for a DC separately-excited motor.

Referring to FIG. 1, a single-phase AC power source 1 is connected to a pair of AC terminals of a diode bridge comprising diodes 2, 3, 4 and 5. In parallel with a field winding 6 of a DC motor connected to the positive and negative terminals of the diode bridge is connected a series circuit of a forward connected SCR 7 and an armature 8 of the DC motor. A diode 9 is connected in reverse direction in parallel with the armature 8 in order to establish an energy circulation circuit for circulating the inductive energy stored in the winding of the armature 8 when the SCR 7 is turned off.

In operation, the power supplied from the AC power source 1 is rectified 11 by the full-wave diode bridge rectifier and is applied to the field winding 6. SCR 7 is conducted at a suitable phase angle to supply the power to the armature 8. When the load is large the armature current $I_A$ flows in the next half cycle after the SCR 7 is conducted. In such a case, SCRs may be turned off easily by using two SCRs in the DC circuit. But in the prior art circuit of the type shown in FIG. 1, it becomes difficult to turn off the SCR 7 positively depending upon the voltage and frequency of the power source, as will be described in more detail hereinafter, so that the circuit shown in Fig. 1 has not been widely used in practice. When the load is large, SCR 7 is turned off in the following manner. First, we consider the conditions at the period close to zero voltage of the power source voltage applied to the single phase AC bridge circuit, that is, the period when the polarity of the voltage of the AC power source changes from positive to negative or negative to positive. In this period, we may consider that the field current $I_F$ is substantially constant. When the power source current is denoted by $I_s$, the field current by $I_F$, and the armature current by $I_A$, the following relation is held since SCR 7 is conducting:

$$I_s = I_F + I_A$$

When the polarity of the power source voltage changes, so does the AC power source current $I_s$ so that $$|I_s| < I_F + I_A.$$

At the instant when the above condition occurs, because of the inductance of the armature 8, the current starts to circulate through the circuit consisting of the armature 8 and the diode 9 so that the armature current $I_A$ supplements the decrease in supply from the AC power source current $I_s$ and the supply of the current to the armature 8 from the power source 1 decreases to zero. When $|I_s|$ is less than $I_F$, the inductance of the field winding 6 causes the current to circulate through the circuit consisting of the field winding 6 and the series-connected diodes 2 and 3 or 4 and 5 of the diode bridge 11 so as to supplement the decrease of the supply of the field current $I_F$ from the AC power source 1. In this case, SCR 7 is applied with the reverse voltage $-Vd$ which is the voltage drop between the anode and cathode of a diode when conducted. When the negative terminal of the DC circuit is taken as a reference point, the current corresponding to the deficiency of the supply to the field current $I_F$ circulates through the two series-connected diodes of the single phase bridge rectifier, so that the voltage drop is $-2Vd$. However the potential at the cathode of SCR 7 is $-Vd$ because of the circulating armature current $I_A$, so that a reverse voltage $-Vd$ is applied to the anode of SCR 7 with respect to the cathode thereof. Thus, SCR 7 is turned off. The time when the reverse voltage is applied to SCR 7 is the time when the field current $I_F$ which is larger than $|I_s|$ circulates the single phase bridge rectifier, and is equal to the time when the AC power source voltage is between $+2Vd$ and $-2Vd$. When the voltage at the upper terminal of the AC power source 1 is $+2Vd$ with respect to the lower terminal, the power source current $I_s$ flows into the field winding 6 through the diode 3 so that the cathode voltage thereof is $+Vd$ while the anode voltage is $+2Vd$. If the reactance voltage due to the decrease in the field current is almost zero, the voltage at the anode of the diode 4 is $+Vd$, and the power source current $I_s$ flows through the diode 4 into the lower terminal of the AC voltage source 1 which is at zero voltage. In this case, a slight reactance voltage is produced across the field winding 6, so that the circulating current starts to flow through the single-phase bridge rectifier. When the voltage at the upper terminal of the AC power source 1 is $-2Vd$ with respect to the lower terminal, so that the circulation of the field current $I_F$ is stopped, the time when $I_s$ is less than $I_F$ may be considered as a short time when the voltage of the AC power source 1 changes from $+2Vd$ to $-2Vd$. This time becomes shorter as the voltage and frequency of the AC power source 1 are increased. When this time is shorter than the turn-off time of SCR 7, the ability of SCR 7 for interrupting the flow of current in the forward direction is not recovered, so that SCR is conducted from the beginning, and the phase control of SCR 7 becomes impossible. The present invention was made to eliminate the turn-off failure of SCR 7.

THE INVENTION, FIGS. 2 AND 3

Figure 2:
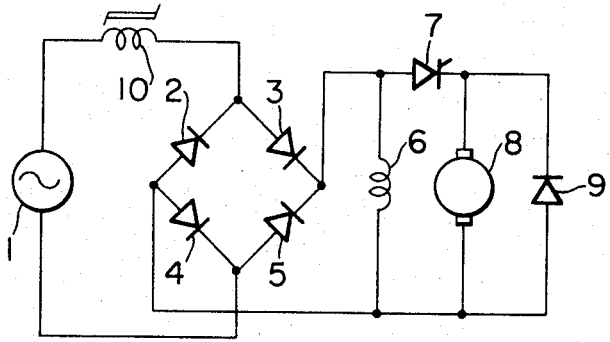
FIG. 2 is a circuit diagram of a single phase bridge phase control circuit in accordance with the present invention applied to a DC separately-excited motor.
Figure 3A:
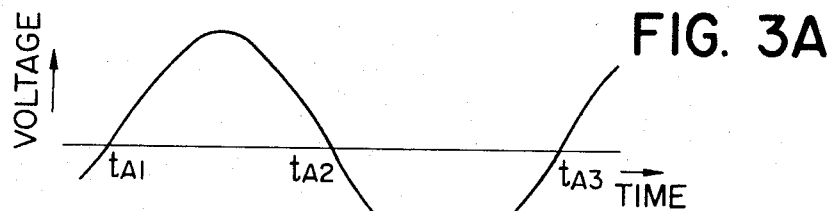
FIG. 3A to FIG. 3F illustrate the waveforms at various points in the circuit shown in FIG. 2 used for explanation of the mode of operation thereof.
Figure 3B:
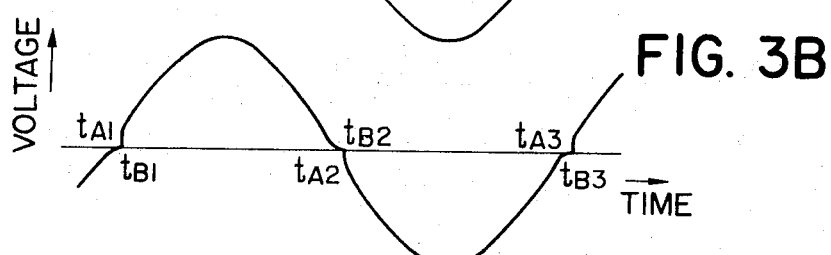
Figure 3C:
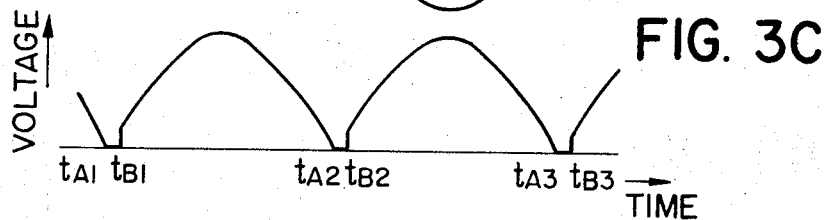
Figure 3D:
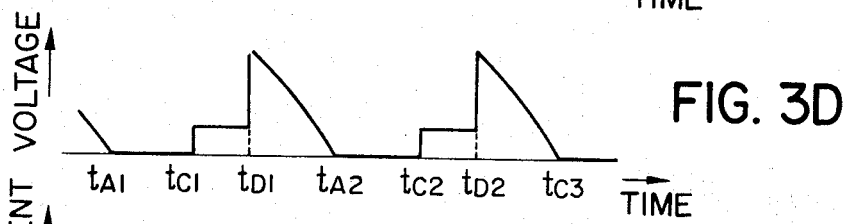
Figure 3E:
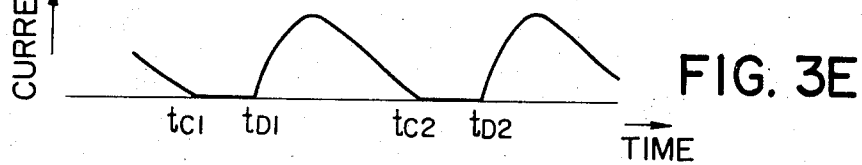
Figure 3F:
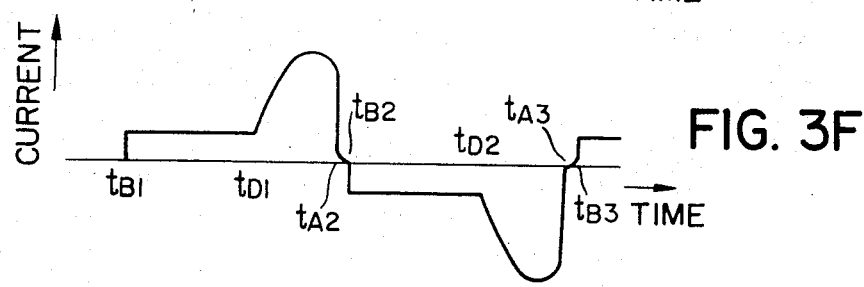

FIG. 2 illustrates the circuit diagram of a phase control circuit of the single phase bridge type in accordance with the present invention applied to a separately-excited DC shunt motor. Circuit components similar to those shown in FIG. 1 are designated by same reference numerals. The phase control circuit shown in FIG. 2 is different from that shown in FIG. 1 in that a saturable reactor 10 is inserted between the AC power source 1 and the diode bridge. Instead of the saturable reactor 10, an ordinary unsaturable reactor may be used, but it is preferable to use the saturable reactor 10 saturated with a small current in order to improve the control performance In FIG. 3A to FIG. 3F, the waveforms at various points of the circuit shown in FIG. 2 are illustrated. FIG. 3A illustrates the waveform of the voltage of the AC power source 1. FIG. 3B illustrates the waveform of the input voltage applied to the single phase bridge rectifier through the saturable reactor 10. FIG. 3C illustrates the waveform of the output voltage of the single phase bridge rectifier. During the initial time periods from $t_{A1}$ to $t_{b1}$, from $t_{A2}$ to $T_{B2}$ and from $t_{A3}$ to $t_{B3}$ of the half cycles, the polarity inversion of the AC current is gradual because of the saturable reactor 10. During these time intervals, the saturable reactor 10 produces the inductance voltage sustantially equal to the rising voltage of the AC voltage so that the voltage at these time intervals is equal to substantially zero. The voltage whose waveform is shown in FIG. 3C is applied across the field winding 6, and a constant smoothed field current flows therethrough because of its inductance. SCR 7 is conducted at $t_{D1}$ so that the power source voltage is applied across the armature 8. When no armature current flows through the armature 8, the counterelectromotive force is produced in proportion to the rotational speed thereof. The waveform of the armature voltage is shown in FIG. 3D, and the waveform of the armature current is shown in FIG. 3E. The AC power source 1 must supply not only the constant field current to the field winding 6 in the DC circuit but also the armature current. In practice, the AC current whose waveform is shown in FIG. 3F flows. From time $t_{B1}$ to time $t_{D1}$, a constant field current is supplied, and when SCR 7 is conducted at time $t_{D1}$ the armature current is supplied until time $t_{A2}$. At time $t_{A2}$, the field current consists of the current supplied from the AC source 1 through the saturable reactor 10 and the circulating current circulating through the circuit consisting of the field winding 6 and the series-connected diodes 2 and 3 or 4 and 5 of the single phase bridge rectifier. The armature current is the decreasing current circulating through the circuit consisting of the armature 8 and the diode 9. At this time, the reverse voltage is applied to SCR 7 in a manner substantially similar to that described with reference to FIG. 1 so that SCR 7 is turned off. The voltage at the anode of SCR 7 is $-2Vd$ with respect to the negative terminal of the single phase bridge rectifier because the field current circulates the circuit consisting of the field winding 6 and the two series-connected diodes of the rectifier. Since the armature current circulates through the diode 9, the cathode voltage of SCR 7 becomes $-Vd$ with respect to the negative terminal. Therefore the reverse voltage $-Vd$ is applied to the anode of SCR 7 with respect to the cathode thereof from time $t_{A2}$ to $t_{B2}$ so that SCR 7 is turned off.

At time $t_{B2}$, the AC power source current equals the field current and supplies the field current. Since the field current is almost constant, the saturable reactor 10 will not produce the reactance voltage so that the positive voltage rectified by the single-phase bridge rectifier on the AC side is applied to the anode of SCR 7. When the time interval from time $t_{A2}$ to $t_{B2}$ is sufficiently longer than the turn-off time of SCR 7, the problem of mis-firing may be overcome and SCR 7 remains in the nonconduction state until the firing or triggering signal is applied at time $t_{D2}$.

If the saturable reactor 10 is saturaged with a current greater than the field current, it exhibits the inductance when SCR 7 is conducted at time $t_{D1}$ so that the AC power source voltage itself is not directly applied to the armature 8, but the AC power source voltage is divided by the saturable reactor 10 thus resulting in the decrease in voltage applied to the armature 8. Furthermore, if the inductance of the saturable reactor 10 is too large, it becomes difficult to conduct SCR 7. Therefore, it is preferable to use a saturable reactor which may be saturated with a current smaller than the field current. If such a saturable reactor is used, the time interval from time $t_{A2}$ to time $t_{B2}$ equals the saturation time $t_s$ of the saturable reactor 10. Thus, it becomes possible to design the saturable reactor 10 so that the minimum but sufficient reverse voltage application time of SCR 7 may be determined. When the flux $\phi$ (in weber) changes from its positive saturated value $+\phi_s$ to its negative saturated value $-\phi_s$ in $t_s$ seconds the number of turns of the saturable reactor 10 is N (turns), and the voltage induced across the saturable reactor is $\theta_s$ (volts), the following relation is held:

$$\theta_s = -N \, d\phi / dt$$

Hence, $$\phi_s N = 1/2 \int_0^{t_s} \theta_s dt.$$

The term $\theta_s$ equals substantially the rising voltage of the single-phase AC source 1, and the right term represents the source voltage applied to the saturable reactor 10 in $t_s$ seconds. When a suitable N is selected from $\theta_s N$, $\theta_s$ is determined. From $\phi_s$ selected, the sectional area and the characteristics of the core used, and the saturation current of the saturable reactor may be determined. Thus, the saturable reactor 10 may be so designed that SCR 7 may have a sufficient turn-off time.

If the load is so small that the armature current becomes zero between time $t_{A2}$ and time $t_{B2}$, the voltage $-2Vd$ is applied to the anode of SCR 7 with respect to the negative terminal of the DC circuit whereas the positive counterelectromotive force in proportion to the rotational speed is applied to the cathode. Therefore, the reverse voltage is applied for a sufficient time to the anode until the source voltage higher than the cathode voltage appears, so that even when the forward voltage is applied SCR 7, mis-firing may be prevented.

The single phase bridge phase control circuit described so far may be applied to a circuit in which a reactor is used in place of the field winding 6 and a resistor or inductor load is used instead of the armature 8.

In the phase control circuit of the type shown in FIG. 1 using only one SCR, the turn-off of SCR 7 is not reliable in operation. When the circuit is used for controlling a DC motor and if the counterelectromotive force induced across the armature is small or if the source voltage as well as its frequency are high, there is a danger that SCR is not applied with a reverse voltage for a sufficient time to turn off SCR. If the frequency response of the silicon controlled rectifier is slow and when the single phase bridge consists of the diodes whose voltage drop in the forward direction is small, the failure in turn-off of SCR occurs so that the motor is supplied with the full power in the next half cycle, thus resulting in hunting. Thus, the circuit of the type shown in FIG. 1 has not been widely used in practice. However, when the saturable reactor 10 is inserted according to the present invention as shown in FIG. 2, SCR 7 may have a sufficient turn-off time so that the problem of misfiring may be overcome. Since only one SCR is used there may be provided a single phase bridge phase control circuit which is simple in construction, more economical to build and is reliable in operation.

When a reactor is inserted in place of the field winding 6 in the DC circuit so that a constant current may flow, the single phase bridge phase control of the inductance or resistance load may become possible.

What is claimed is:

1. A controlled D.C. power supply of the type using a source of A.C. voltage comprising
    a saturable reactor for coupling to one side of the A.C. source,
    full wave rectifying means for rectifying the A.C. voltage coupled to said saturable reactor, and to the other side of the A.C. source,
    an SCR having its anode coupled to the positive output terminal of said rectifying means,
    a D.C. load coupled to the cathode of said SCR and to the negative output terminal of said rectifying means and,
    an inductive reactance connected between said positive and negative output terminals of said bridge;
    said saturable reactor enabling said SCR to turn off at a predetermined voltage at said rectifying means output terminals.

2. A controlled D.C. supply as recited in claim 1 wherein
    said D.C. load comprises an armature winding of a D.C. shunt motor and a rectifier in parallel with said armature having the anode thereof coupled to the cathode of said SCR;
    said reactance being the field winding of said D.C. shunt motor and
    said rectifying means comprising a single phase A.C. bridge.

3. The controlled D.C. power supply of claim 2 wherein said saturable reactor is saturable with a saturation current smaller than the saturation current of said field winding.

4. The controlled D.C. supply of claim 2 wherein said saturable reactor is saturable by current from said source of A.C. voltage, the saturation time of said saturable reactor being longer than the turn off time of said SCR.

* * * * *

UNITED STATES PATENT OFFICE
CERTIFICATE OF CORRECTION

Patent No. 3,777,239  Dated December 4, 1973

Inventor(s) Tsutomu Seri, et al

It is certified that error appears in the above-identified patent and that said Letters Patent are hereby corrected as shown below:

In claim 2, line 5: Change "anode" to --cathode--.

Please amend claim 3 as follows:

3. The controlled D.C. power supply of claim 2 wherein said saturable reactor is saturable with a [saturation] current smaller than the [saturation] _field_ current of said field winding.

Signed and Sealed this second Day of March 1976

[SEAL]

Attest:

RUTH C. MASON
Attesting Officer

C. MARSHALL DANN
Commissioner of Patents and Trademarks